United States Patent
Liu

(10) Patent No.: US 10,476,562 B2
(45) Date of Patent: Nov. 12, 2019

(54) COMMUNICATION DEVICE AND METHOD

(71) Applicant: ACCTON TECHNOLOGY CORPORATION, Hsinchu (TW)

(72) Inventor: I-Ru Liu, Taipei (TW)

(73) Assignee: ACCTON TECHNOLOGY CORPORATION, Hsinchu (TW)

( * ) Notice: Subject to any disclaimer, the term of this patent is extended or adjusted under 35 U.S.C. 154(b) by 0 days.

(21) Appl. No.: 16/136,273

(22) Filed: Sep. 20, 2018

(65) Prior Publication Data

US 2019/0089426 A1 Mar. 21, 2019

(30) Foreign Application Priority Data

Sep. 21, 2017 (TW) ............... 106132466 A

(51) Int. Cl.
H04B 7/04 (2017.01)
H04B 7/06 (2006.01)
H04B 7/08 (2006.01)
H04B 7/0452 (2017.01)
H04B 7/0417 (2017.01)
H04B 17/318 (2015.01)

(52) U.S. Cl.
CPC ......... *H04B 7/0452* (2013.01); *H04B 7/0417* (2013.01); *H04B 7/0691* (2013.01); *H04B 17/318* (2015.01)

(58) Field of Classification Search
CPC .. H04B 7/0452; H04B 17/318; H04B 7/0417; H04B 7/0691

USPC .................. 375/267, 299, 347; 455/101, 132
See application file for complete search history.

(56) References Cited

U.S. PATENT DOCUMENTS

| 9,042,276 B1* | 5/2015 | Harel ............... H04J 3/1694 370/277 |
| 2013/0077597 A1* | 3/2013 | Nukala ............... H04B 7/0417 370/330 |
| 2016/0094318 A1* | 3/2016 | Shattil ............... H04B 7/026 375/267 |
| 2016/0380733 A1* | 12/2016 | Tseng ............... H04L 5/0048 375/267 |

* cited by examiner

*Primary Examiner* — Tesfaldet Bocure
(74) *Attorney, Agent, or Firm* — CKC & Partners Co., LLC

(57) ABSTRACT

A communication method includes grouping a plurality of antenna patterns of a communication device according to an antenna device group corresponding to different antenna combinations to form a plurality of antenna pattern groups, and selecting an antenna pattern group from the antenna pattern groups; according to a plurality of signal parameter statistics of a plurality of antenna pattern combinations corresponding to each of the selected antenna pattern group, selecting a first antenna pattern combination and a last antenna pattern combination among the plurality of antenna pattern combinations; and according to first data related to the first antenna pattern combination and second data related to the last antenna pattern combination, setting the first antenna pattern combination or the last antenna pattern combination as a transmission antenna pattern combination for data transmission.

10 Claims, 5 Drawing Sheets

COMMUNICATION DEVICE AND METHOD

RELATED APPLICATIONS

This application claims priority to Taiwan Application Serial Number 106132466, filed Sep. 21, 2017, which is herein incorporated by reference.

BACKGROUND

Technical Field

The present disclosure relates to a communication method, particularly to a communication method of selecting antenna pattern combinations.

Description of Related Art

In a traditional multi-user multiple input multiple output (MU-MIMO) antenna system, an access point (AP) or a router uses a received signal strength indicator (RSSI) to determine a user's location, and then decides an antenna's direction.

However, it is impossible to know an exact location of the user just according to the RSSI. Moreover, when there is a rogue AP or a rogue router in the system, the rogue device is usually regarded as the user because of its RSSI, and resulting in a wrong antenna direction to it. This, in turn, decreases the data transmission throughput of the real user.

Therefore, ways in which to properly control antenna direction to thereby increase the transmission throughput between the antenna and users have become important topics of discussion in the area of MU-MIMO antenna systems.

SUMMARY

The present disclosure provides a communication method adapted in a multi-user MIMO system. The communication method selects an antenna pattern combination from the antenna pattern combinations of communication device such as wireless access point or router to perform an uplink transmission and selects an antenna pattern combination from the antenna pattern combinations of the router to perform a downlink transmission according to the changes of the received signal strength indicators and the data rates. In contrast, the traditional method for selecting the antenna pattern combination only according to the received signal strength indicators, the present disclosure further adjusts the transmission antenna pattern combination based on the transmission data rates that expresses communication between the communication devices and users more accurate. The communication method in the present disclosure takes both the received signal strength indicators and the data rates into account. Furthermore, the transmission efficiency between the communication devices and the users can be improved by using the concept of grouping.

In some embodiments, a communication method includes grouping a plurality of antenna patterns of a communication device to form a plurality of antenna pattern sets according to an antenna device group, wherein the antenna device group corresponds to different antenna combinations of different user devices, and selecting at least one antenna pattern set from the antenna pattern sets; selecting a first antenna pattern combination and a last antenna pattern combination from a plurality of antenna pattern combinations according to a plurality of signal parameter statistics of the antenna pattern combinations corresponding to each of the selected at least one antenna pattern set; and setting the first antenna pattern combination or the last antenna pattern combination to be a transmission antenna pattern combination to perform a data transmission according to a first data associated with the first antenna pattern combination and a second data associated with the last antenna pattern combination.

In some embodiments of the present disclosure, the step of selecting the at least one antenna pattern set comprises selecting the antenna pattern sets when a network status is unknown; and selecting the at least one antenna pattern set according to a comparison result of a plurality of weights and a plurality of thresholds when the network status is known. The weights are determined by the network status and represent the relationship between a plurality of antenna device sets and corresponding antenna pattern sets. The thresholds correspond to the setting of the antenna pattern sets.

In some embodiments of the present disclosure, the communication method further comprises changing an uplink transmission antenna pattern combination used for currently performing an uplink data transmission from an uplink first antenna pattern combination to an uplink last antenna pattern combination, or changing a downlink transmission antenna pattern combination used for currently performing a downlink data transmission from a downlink first antenna pattern combination to a downlink last antenna pattern combination according to the relationship of the first data and the second data.

In some embodiments of the present disclosure, the communication device changes the uplink first antenna pattern combination to the uplink last antenna pattern combination when an uplink transmission data rate is lower than a last uplink transmission data rate, and changes the downlink first antenna pattern combination to the downlink last antenna pattern combination when an downlink transmission data rate is lower than a last downlink transmission data rate.

In some embodiments of the present disclosure, selecting the first antenna pattern combination and the last antenna pattern combination from the antenna pattern combinations according to the signal parameter statistics of the antenna pattern combinations that correspond to at least one antenna pattern set further comprises selecting the first antenna pattern combination and the last antenna pattern combination from the antenna pattern combinations according to a plurality of received signal strength indicator statistics of each of the antenna pattern combinations corresponding to the at least one antenna pattern set. The first antenna pattern combination has a maximal one of the received signal strength indicator statistics, and the last antenna pattern combination has a minimal one of the received signal strength indicator statistics.

In some embodiments of the present disclosure, setting the first antenna pattern combination or the last antenna pattern combination to be the transmission antenna pattern combination to perform a data transmission according to the first data associated with the first antenna pattern combination and the second data associated with the last antenna pattern combination further comprises selecting the first antenna pattern combination to be the transmission antenna pattern combination when the data rate of the first data of the first antenna pattern combination is higher than the data rate of the second data of the last antenna pattern combination, and selecting the last antenna pattern combination to be the transmission antenna pattern combination when the data rate of the first data of the first antenna pattern combination is lower than the data rate of the second data of the last antenna pattern combination.

In addition, a communication device is also disclosed. The communication device includes a detector, an antenna unit, and a processor. The communication device detector communicates with an antenna device group and detects a plurality of signal parameters and a plurality of data corresponding to the antenna device group of client terminals. The processor is coupled to the detector and the memory. The processor groups a plurality of antenna patterns of the antenna unit to form a plurality of antenna pattern sets according to the antenna device group, and selects at least one antenna pattern set from the antenna pattern sets. The processor further selects a first antenna pattern combination and a last antenna pattern combination from a plurality of antenna pattern combinations corresponding to each of the at least one selected antenna pattern set according to the signal parameters. The processor further sets the first antenna pattern combination or the last antenna pattern combination to be a transmission antenna pattern combination according to the plurality of data, and transmits the transmission antenna pattern combination to the antenna unit. The antenna unit is further configured to perform a transmission with the antenna device group according to the transmission antenna pattern combination.

In some embodiments of the present disclosure, the processor selects one or some of the antenna pattern sets according to a comparison result of a plurality of weights corresponding to the antenna pattern sets and a threshold when a network status is known.

In some embodiments of the present disclosure, the processor is further configured to change an uplink first antenna pattern combination to an uplink last antenna pattern combination to perform an uplink data transmission via the antenna unit, or change a downlink first transmission antenna pattern combination to a downlink last antenna pattern combination to perform a downlink data transmission via the antenna unit according to the relationship of a first data corresponding to the first antenna pattern combination and a second data corresponding to the last antenna pattern combination.

In some embodiments of the present disclosure, the processor is further configured to control the antenna pattern combination of the antenna unit to change from the uplink first antenna pattern combination to the uplink last antenna pattern combination when an uplink transmission data rate is lower than a last uplink transmission data rate, and to control the antenna pattern combination of the antenna unit to change from the downlink first antenna pattern combination to the downlink last antenna pattern combination when a downlink transmission data rate is lower than a last downlink transmission data rate.

BRIEF DESCRIPTION OF THE DRAWINGS

This disclosure can be more fully understood by reading the following detailed description of the embodiments, with reference made to the accompanying drawings as follows.

DETAILED DESCRIPTION

Figure 1:
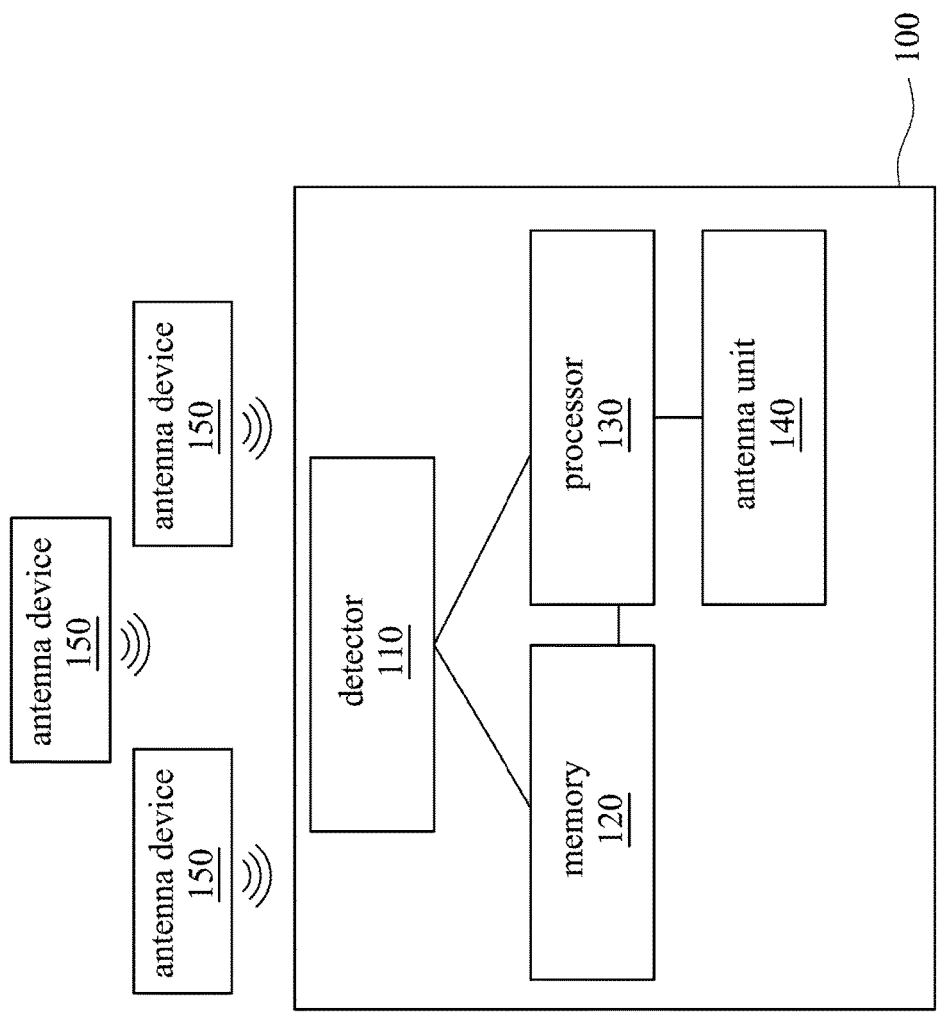
FIG. 1 is a block diagram of a communication system in accordance with some embodiments of the present disclosure.

Reference will now be made in detail to the present embodiments of the disclosure, examples of which are illustrated in the accompanying drawings. Wherever possible, the same reference numbers are used in the drawings and the description to refer to the same or like parts.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram of a communication system in accordance with some embodiments of the present disclosure. As shown in FIG. 1, the communication system includes a communication device 100 and a number of antenna devices 150.

In some embodiments, the communication device 100 communicates with the antenna devices 150 used by end users to perform data transmission via wireless communication. In some embodiments, the communications between the communication device 100 and the antenna devices 150 are accomplished by means of multi-user multiple input multiple output (MIMO) technologies. The communication device 100 can adjust directions of antennas to the antenna devices 150 according to MIMO technologies; therefore, the space diversity and frequency efficiency can be fully utilized to increase the total capacity of the communication system.

In some embodiments, the communication device 100 communicates with the antenna devices 150 by means of orthogonal frequency division multiple access (OFDMA). Therefore, the communication device 100 can communicate with the antenna devices 150 at the same time, and moreover can efficiently solve the problem of frequency interference during communication.

In some embodiments, the communication device 100 includes, but is not limited to, a wireless access point (AP) with a number of antennas, a router, or other communication devices, and the antenna device 150 includes, but is not limited to, a cell phone, a notebook or even another router. Any device with a plurality of antennas and which is capable of transmitting signals via wireless transmission is within the scope of the present disclosure.

In some embodiments, the antenna devices 150 have different antenna types, where the antenna types can be represented by spatial streams of the antenna devices 150 or the number of transmitting antennas×the number of receiving antennas. The antenna type can be used to classify the antenna devices 150, and serve as a reference for providing wireless source. In some embodiments, different types of the electronic devices or different types of the antenna devices 150 may correspond to different number of spatial streams. For example, the antenna device 150 with spatial stream 1×1 can be a smart phone, the antenna device 150 with spatial stream 2×2 can be a tablet computer, the antenna device 150 with spatial stream 3×3 can be a laptop, and the antenna device 150 with spatial stream 4×4 can be a router.

As shown in FIG. 1, in some embodiments, the communication device 100 includes a detector 110, a memory 120, a processor 130 and an antenna unit 140, in which the antenna unit 140 includes a plurality of antenna elements. The detector 110 is coupled to the memory 120 and the processor 130, the memory 120 is coupled to the processor 130, and the processor 130 is further coupled to the antenna unit 140.

In some embodiments, the detector 110 is used to receive messages from the antenna devices 150, and to store the messages in the memory 120. The processor 130 generates results according to the messages and transmits the results to the antenna unit 140 to control antenna patterns of the antenna unit 140. The communication device 100 can then perform data transmission with the antenna devices 150 based on the antenna patterns.

In some embodiments, the detector 110 is used to detect antenna types and data of the antenna devices 150, and the detector 110 is further used to scan signal parameters of the communication system. In some embodiments, the signal parameters include, but are not limited to, received signal strength indicators (RSSI). Any parameter which is associated with signal strength and which can be instantaneously obtained is within the scope of the present disclosure. In some embodiments, the data of the antenna devices 150 detected by the detector 110 includes, but is not limited to, data rate, number of spatial streams or index of modulation and coding scheme (MCS index). Any index that can be used to represent transmission data rate between the communication device 100 and the antenna devices 150 is within the scope of the present disclosure.

In some embodiments, the memory 120 is used to store the signal parameters, the data, and a network status which are detected by the detector 110. In some embodiments, the network status includes, but is not limited to, an antenna pattern set or an antenna pattern combination received recently by the memory 120. Any information that can be used to represent location and usage of a network user is within the scope of the present disclosure. In some embodiments, the memory 120 includes, but is not limited to, a memory or other memory equipment. Any device that can be used to store the messages associated with the antenna devices 150 is within the scope of the present disclosure.

In some embodiments, the processor 130 is used to generate data according to results detected by the detector 110, and store the data in the memory 120. In some embodiments, the processor 130 is used to group antenna patterns corresponding to the antenna elements of the antenna unit 140 according to the antenna types of the antenna devices 150 detected by the detector 110 to form antenna pattern sets, and to select at least one antenna pattern set from the antenna pattern sets to provide communication resources with respect to the different antenna devices 150. In some embodiments, the processor 130 calculates signal parameter statistics corresponding to antenna pattern combinations, according to signal parameters corresponding to the antenna pattern combinations of each of the selected at least one antenna pattern sets. In some embodiments, the processor 130 selects a first antenna pattern combination with the largest signal parameter and a last antenna pattern combination with the smallest signal parameter from the antenna pattern combinations according to the signal parameter statistic. In some embodiments, the processor 130 sets the first antenna pattern combination or the last antenna pattern combination as a transmission antenna pattern combination according to first data corresponding to the first antenna pattern combination, and second data corresponding to the last antenna pattern combination, in which the first data and the second data are from among the data detected from the detector 110. Next, the processor 130 transmits the transmission antenna pattern combination to the antenna unit 140 as an antenna pattern combination used for communication between the communication device 100 and the antenna devices 150.

In some embodiments, the processor 130 includes, but is not limited to, a processor with a calculation function. Any unit that can be used to perform the corresponding calculation based on the results detected by the detector 110 is within the scope of the present disclosure.

In some embodiments, the antenna unit 140 is used to perform data transmission with the antenna devices 150 according to the received transmission antenna pattern combination. In some embodiments, the antenna unit 140 includes, but is not limited to, an omnidirectional antenna(s) or a directional antenna(s). Any device that can be used to radiate energy is within the scope of the present disclosure.

In some embodiments, the communication device 100 includes the memory 120 and the processor 130, and does not include the detector 110 and the antenna unit 140. The detector 110 and the antenna unit 140 are included in a router (not shown). In this case, the communication device 100 is further coupled to the router containing the detector 110 and the antenna unit 140. The communication device 100 is used to receive the detection results from the router, and to select an antenna pattern combination according to the detection results. The communication device 100 is further used to transmit the antenna pattern combination to the router to control the router's antenna directions. In some embodiments, the communication device 100 includes, but is not limited to, a data processor. Any device that can be used to control the router's antenna directions is within the scope of the present disclosure.

Figure 2:
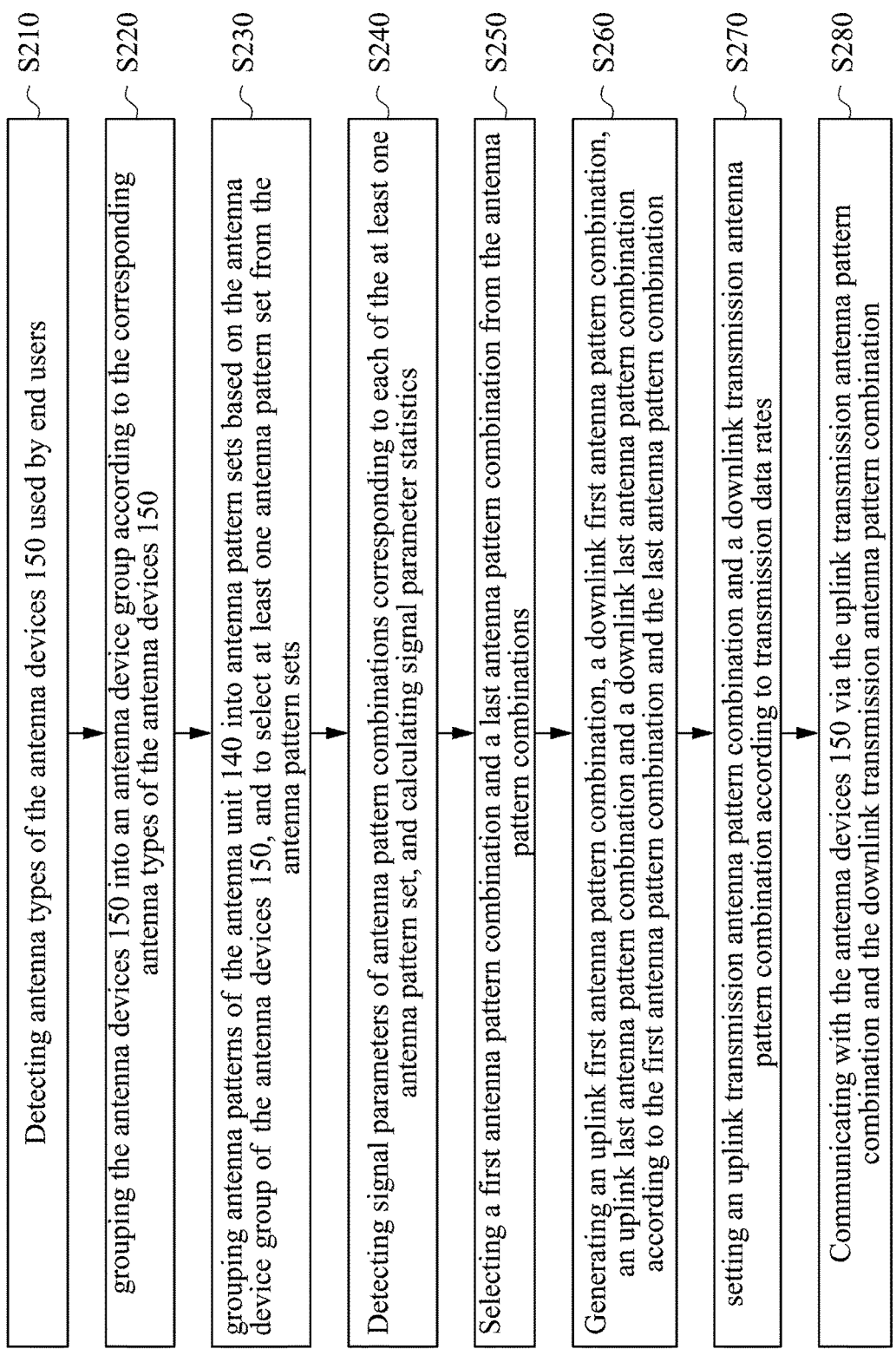
FIG. 2 is a flowchart of a communication method applied in the communication system shown in FIG. 1 in accordance with some embodiments of the present disclosure.

FIG. 2 is a flowchart of a communication method 200 applied in the communication system shown in FIG. 1 in accordance with some embodiments of the present disclosure. It is noted that the communication method 200 is not limited to be applied in the communication system shown in FIG. 1. For convenience and clarity, the communication method 200 will be described below with reference to the communication system illustrated in FIG. 1.

As shown in FIG. 2, first, operation S210 is executed to detect antenna types of the antenna devices 150 used by end users. In some embodiments, the detector 110 obtains antenna types of the antenna devices 150 through a wireless network standard, which includes, but is not limited to, wireless network standard 802.11 ac and wireless network standard 802.11 ax. Any wireless network standards that can achieve the above operation are within the scope of the present disclosure. Since the wireless network standard 802.11 ac and the wireless network standard 802.11 ax both contain a channel detection mechanism, the detector 110 can transmit the antenna types of the antenna devices 150 to the memory 120 according to a channel feedback provided by each of the antenna devices 150.

Subsequently, operation S220 is executed to group the antenna devices 150 into an antenna device group according to the corresponding antenna types of the antenna devices 150. In some embodiments, the processor 130 is able to classify the antenna devices 150 into an antenna device set according to the corresponding antenna types of the antenna devices 150 respectively, and group the antenna device sets into the antenna device group. For example, the processor 130 classifies the antenna devices 150 with spatial stream 1×1 into an antenna device set, and groups the antenna device set with other antenna device sets into an antenna device group.

Figure 3A:
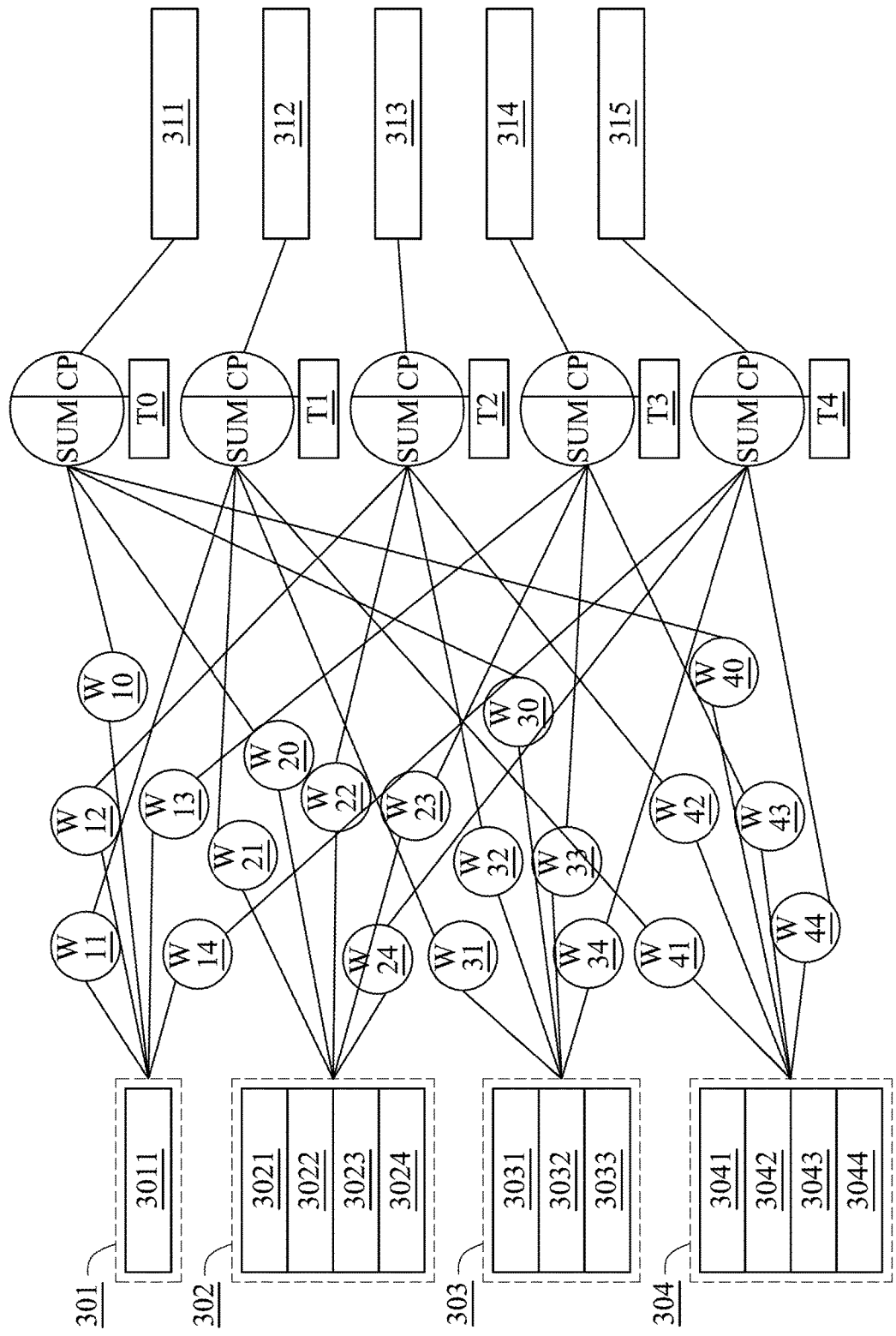
FIG. 3A is a status diagram of a part of the communication method in accordance with some embodiments of the present disclosure.

With respect to operation S220, reference is made to FIG. 2 and FIG. 3A, in which FIG. 3A is a status diagram of a part of the communication method 200 in accordance with some embodiments of the present disclosure. As shown in FIG. 3A, the processor 130 groups the antenna devices 150 into one of antenna device group 301, antenna device group 302, antenna device group 303 and antenna device group 304 according to antenna combinations of the antenna devices 150. In some embodiments, the antenna device group 301 can include antenna device set 3011, in which the antenna device set 3011 includes antenna devices with spatial stream 4×4. The antenna device group 302 can only include antenna device set 3021 and antenna device set 3022, in which the antenna device set 3021 includes antenna devices with spatial stream 3×3, and the antenna device set 3022 includes antenna devices with spatial stream 1×1. Alternatively, the antenna device group 302 can only include antenna device set 3023 and antenna device set 3024, in which the antenna device set 3023 includes antenna devices with spatial stream 2×2, and the antenna device set 3024 includes antenna devices with spatial stream 2×2. The antenna device group 303 can include antenna device set 3031, antenna device set 3032 and antenna device set 3033, in which the antenna device set 3031 includes antenna devices with spatial stream 2×2, the antenna device set 3032 includes antenna devices with spatial stream 1×1, and the antenna device set 3033 includes antenna devices with spatial stream 1×1. The antenna device group 304 can include antenna device set 3041, antenna device set 3042, antenna device set 3043 and antenna device set 3044, in which the antenna device set 3041, the antenna device set 3042, the antenna device set 3043, and the antenna device set 3041 includes antenna devices with spatial stream 1×1 respectively. Therefore, the processor 130 can group the antenna devices 150 into the antenna device groups according to the antenna combination composed by the antenna types in the antenna devices 150 detected by the detector 110.

For example, the processor 130 groups the antenna devices 150 into the antenna device group 303 when the detector 110 detects that the antenna devices 150 include antenna devices with spatial stream 2×2 and antenna devices with spatial stream 1×1.

In operation S220, the purpose of grouping the antenna devices 150 into an antenna device group according to the antenna types is to reduce computation loading and to compensate for an insufficient number of general-purpose input/output (GPIO) of hardware.

Next, operation S230 is executed to group antenna patterns of the antenna unit 140 into antenna pattern sets based on the antenna device group of the antenna devices 150, and to select at least one antenna pattern set from the antenna pattern sets. In some embodiments, the processor 130 further groups different antenna patterns of the antenna unit 140 into the antenna pattern sets based on the antenna device group of the antenna devices 150. For example, the antenna patterns correspond to the number of transmission channels, such as 1TR, 2TR, 3TR or 4TR of the antenna unit 140. Next, the processor 130 selects the at least one antenna pattern set from the antenna pattern sets according to comparing results of several weights and thresholds.

With respect to operation S230, reference is made to FIG. 2 and FIG. 3A. As shown in FIG. 3A, the antenna pattern sets are grouped according to antenna directions, including antenna pattern set 311, antenna pattern set 312, antenna pattern set 313, antenna pattern set 314 and antenna pattern set 315. The antenna pattern set 311 indicates that the antenna pattern of the antenna unit 140 is omnidirectional, the antenna pattern set 312 indicates that the antenna pattern of the antenna unit 140 is 1-peak or 1-lobe directional, the antenna pattern set 313 indicates that the antenna pattern of the antenna unit 140 is 2-peak or 2-lobe directional, the antenna pattern set 314 indicates that the antenna pattern of the antenna unit 140 is 3-peak or 3-lobe directional, and the antenna pattern set 315 indicates that the antenna pattern of the antenna unit 140 is 4-peak or 4-lobe directional.

In some embodiments, the processor 130 calculates corresponding weights and thresholds of each antenna device group. In detail, the processor 130 sets weights corresponding to each of the antenna patterns to the respective antenna device groups according to the number of the antenna pattern sets, and the processor 130 sets different thresholds to each of the antenna pattern sets. In some embodiments, the processor 130 accumulates all the corresponding weights of the antenna device groups via adders SUM, and compares the calculated result with the threshold corresponding to different antenna pattern sets via comparators CP, and selects the at least one antenna pattern set from the antenna pattern sets according to the comparing result. In some embodiments, the threshold T0~T4 correspond to the antenna pattern sets 311~315 and the default value of each of threshold T0, threshold T1, threshold T2, threshold T3 and threshold T4 is 0.5, but is not limited to this value, and the communication system can set different thresholds for different network requirements.

For example, the processor 130 sets weights W30, W31, W32, W33 and W34 corresponding to the respective antenna pattern set to 1 and sets the remaining weights to 0 when the processor 130 determines the antenna devices 150 is the antenna device group 303. The processor 130 then selects antenna pattern set 311, antenna pattern set 312, antenna pattern set 313, antenna pattern set 314 and antenna pattern set 315 based on the calculated result via the adders SUM and the comparators CP. Therefore, a local communication device can communicate with a different antenna device group with a suitable antenna pattern set to meet different requirements by setting different weights and thresholds.

In some embodiments, the memory 120 stores a network status, the processor 130 calculates the corresponding weights and the thresholds according to the antenna device group and the network status, accumulates the corresponding weights via the adders SUM, compares the calculated results with the thresholds via the comparator CP and selects the at least one antenna pattern set to communicate with the antenna devices 150. In some embodiments, the network status is associated with common used antenna pattern sets stored in the memory 120, where the common used antenna pattern sets are, for example, the latest antenna pattern sets selected in the operation S230. In the operation S230, the purpose of default or adaptive antenna pattern sets is to reduce the computation loading and to compensate for an insufficient number of GPIO of hardware.

For example, the processor 130 sets the weights W31 and W32 to 1 and sets the remaining weights to 0 when the common used antenna pattern sets stored in the memory 120 are antenna pattern set 312 and antenna pattern set 313 that corresponding to the weights W31 and W32. The processor 130 then selects the antenna pattern set 312 and the antenna pattern set 313 after calculation via the adders SUM and the comparators CP.

Subsequently, operation S240 is executed to detect signal parameters of antenna pattern combinations corresponding to each of the at least one antenna pattern set, and to calculate signal parameter statistics. In some embodiments, the signal parameter statistic can be, for example, the sum of the received signal strength indicators, the average of the received signal strength indicators, the deviation of the received signal strength indicators, the root mean square of the received signal strength indicators, the variance of the received signal strength indicators, the largest received signal strength indicator, the smallest received signal strength indicator, the median of the received signal strength indicators or the mode of the received signal strength indicators, but is not limited to these examples, and the communication device 100 can set any parameter statistic that can represent the signal strength according to the network status or users' requirements, in which said parameter statistic is within the scope of the present disclosure.

In some embodiments, the signal parameter statistic selected currently by the communication method 200 can be determined by the latest selected signal parameter statistic. In short, the signal parameter statistic used in the communication method 200 can be adjusted according to the current network status.

Figure 3B:
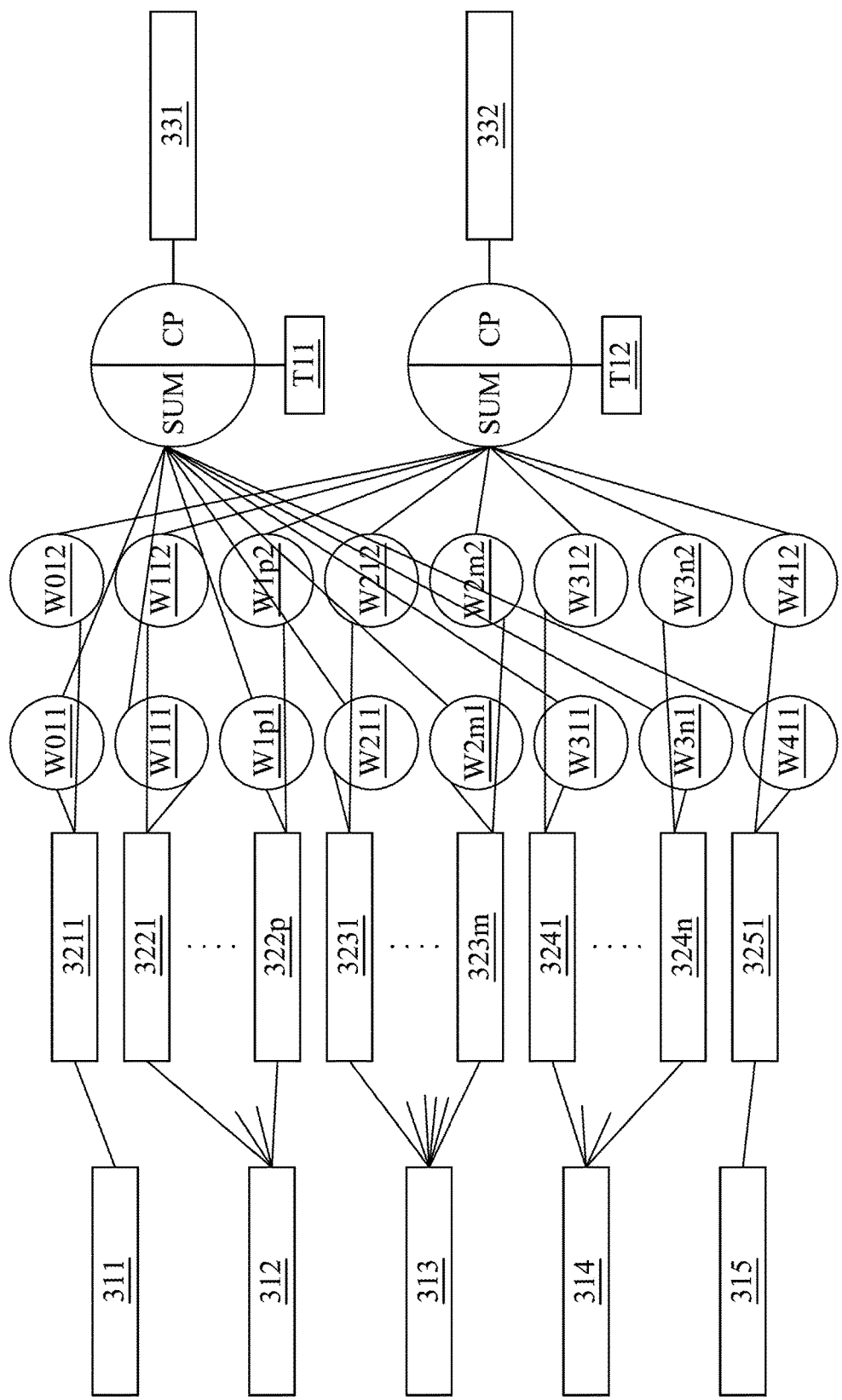
FIG. 3B is a status diagram of a part of the communication method in accordance with some embodiments of the present disclosure.

With respect to operation S240, reference is made to FIG. 2 and FIG. 3B. FIG. 3B is a status diagram of a part of the communication method 200 in accordance with some embodiments of the present disclosure. In some embodiments, different antenna pattern sets correspond to the antenna pattern combinations with different signal parameter statistics. As shown in FIG. 3B, the antenna pattern set 311 corresponds to an antenna pattern combination 3211, the antenna pattern set 312 corresponds to 256 antenna pattern combinations with different signal parameter statistics (i.e., antenna pattern combination 322$p$, where p=1~256), the antenna pattern set 313 corresponds to 1296 antenna pattern combinations with different signal parameter statistics (i.e., antenna pattern combination 322$m$, where m=1~1296), the antenna pattern set 314 corresponds to 256 antenna pattern combinations with different signal parameter statistics (i.e., antenna pattern combination 324$n$, where n=1~256), and the antenna pattern set 315 corresponds to an antenna pattern combination 3251. It is noted that the number of the antenna pattern combinations that correspond to different antenna pattern sets is determined according to number of the combination of the directions respectively selected by antennas of the antenna unit 140. For example, in FIG. 3B, the antenna unit 140 has four antennas pointing to four directions respectively, therefore, antenna field set 311 is an omnidirectional antenna, such that the antenna pattern set 311 corresponds to $C(4,0)^4=1$ antenna pattern combination, which means that each antenna of the antenna unit 140 does not select any direction, then corresponding to the combination of the four antennas; the antenna pattern set 312 corresponds to $C(4,1)^4=256$ antenna pattern combinations, which means that each antenna of the antenna unit 140 selects one direction from four directions of each antenna, then corresponding to the combination of the four antennas; the antenna pattern set 313 corresponds to $C(4,2)^4=1296$ antenna pattern combinations, which means that each antenna of the antenna unit 140 selects two directions from four directions of each antenna, then corresponding to the combination of the four antennas, and so on. Such as the antenna pattern set 314 corresponds to $C(4,3)^4=256$ antenna pattern combinations, and the antenna pattern set 315 corresponds to $C(4,4)^4=1$ antenna pattern combination. Operation S240 is executed to further process the antenna pattern sets.

Next, operation S250 is executed to select a first antenna pattern combination and a last antenna pattern combination from the antenna pattern combinations. In some embodiments, the processor 130 selects the first antenna pattern combination with the largest signal parameter statistic and the last antenna pattern combination with the smallest signal parameter statistic according to the signal parameter statistics calculated in operation S240.

With respect to operation S250, reference is made to FIG. 2 and FIG. 3B. As shown in FIG. 3B, the processor 130 sets two weights to each of the antenna pattern combinations, in which one weight corresponds to the first antenna pattern combination and the other weight corresponds to the last antenna pattern combination. The processor 130 separately calculates and compares the weights corresponding to the first antenna pattern combination and the weights corresponding to the last antenna pattern combination to determine how to implement the first antenna pattern combination and the last antenna pattern combination by those antenna pattern combinations. For example, the processor 130 sets the weights corresponding to the antenna pattern combination with the largest signal parameter statistics and the antenna pattern combination with the smallest signal parameter statistics to 1, and sets the remaining weights to 0. Next, the processor 130 compares the accumulated weights with the threshold T11 and the threshold T12 to get the first antenna pattern combination and the last antenna pattern combination respectively. For example, if the antenna pattern combination with the largest signal parameter statistics is the antenna pattern combination 3231, and the antenna pattern combination with the smallest signal parameter statistics is the antenna pattern combination 3225, the processor 130 sets the weights W211 and W152 to 1, and sets the remaining weights to 0. Next, after calculation via the adder SUM, the processor 130 compares the calculation results with the thresholds T11=0.5 and T12=0.5 via the comparator CP, resulting in the first antenna pattern combination 331 being equal to the antenna pattern combination 3231, and the last antenna pattern combination 332 being equal to the antenna pattern combination 3225. In some embodiments, the weights and the thresholds can be set as above, but the present disclosure is not limited in this regard. Various weights and thresholds set according to the network status and user practical requirements are within the scope of the present disclosure.

In some embodiments, the first antenna pattern combination and the last antenna pattern combination selected by the method in operation S250 can be replaced by the latest used first antenna pattern combination and the latest used last antenna pattern combination obtained from the last execution of the communication method 200. That is because the time interval from the ending of the current communication method to the beginning of the next communication method 200 is relatively small compared to the network status in the general case, approximately $10^{-6}$ times the network status change. Therefore, when the network status is relatively stable, operation S250 uses the latest used first antenna pattern combination and the latest used last antenna pattern combination as the first antenna pattern combination and the last antenna pattern combination to save calculation time.

Next, operation S260 is executed to generate an uplink first antenna pattern combination, a downlink first antenna pattern combination, an uplink last antenna pattern combination and a downlink last antenna pattern combination according to the first antenna pattern combination and the last antenna pattern combination. In some embodiments, the processor 130 determines the uplink first antenna pattern combination, the downlink first antenna pattern combination, the uplink last antenna pattern combination and the downlink last antenna pattern combination according to the first antenna pattern combination and the last antenna pattern combination.

Figure 3C:
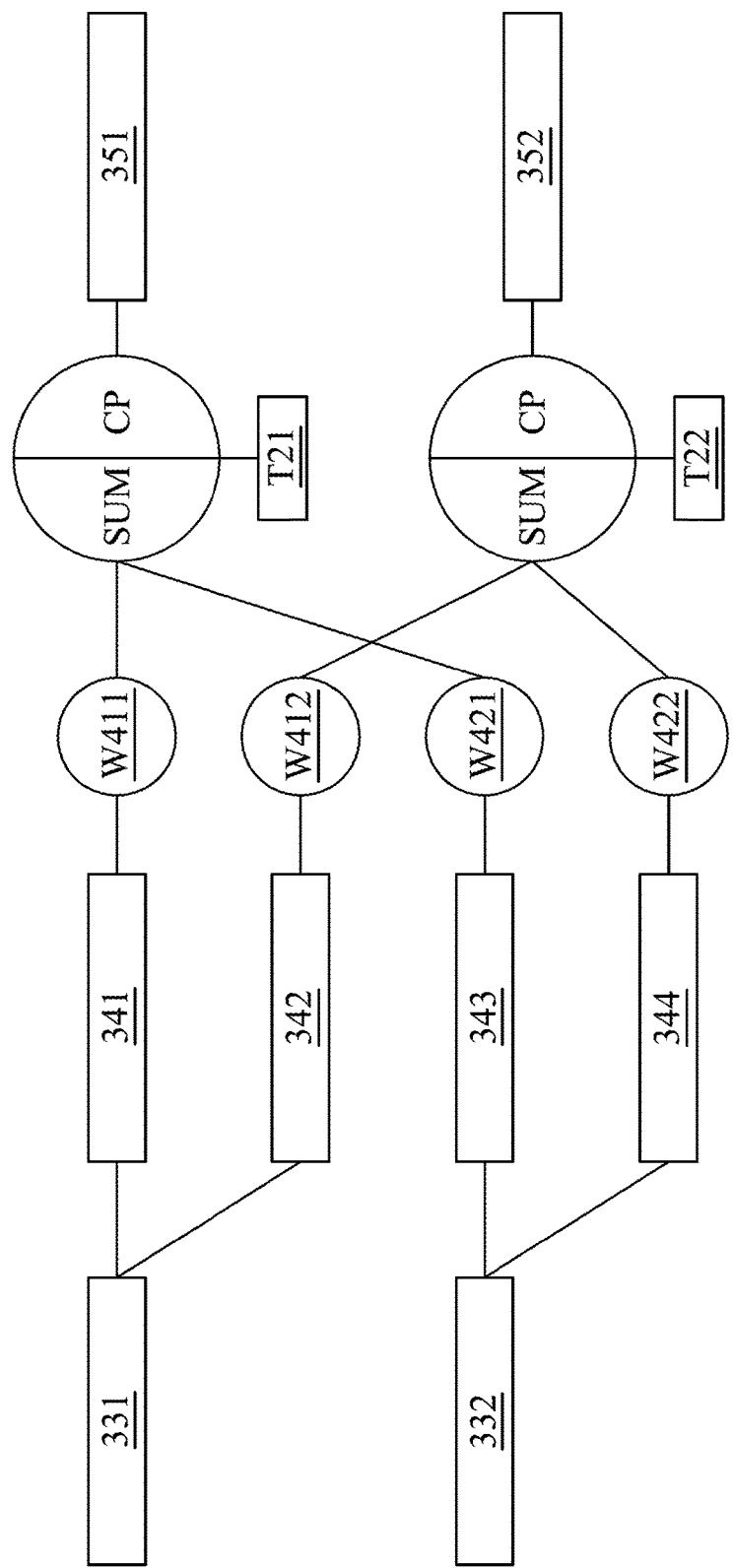
FIG. 3C is a status diagram of a part of the communication method in accordance with some embodiments of the present disclosure.

With respect to operation S260, reference is made to FIG. 2 and FIG. 3C. FIG. 3C is a status diagram of a part of the communication method 200 in accordance with some embodiments of the present disclosure. As shown in FIG. 3C, the processor 130 copies or sets the first antenna pattern combination 331 into the uplink first antenna pattern combination 341 and the downlink first antenna pattern combination 342, the processor 130 further copies the last antenna pattern combination 332 into the uplink last antenna pattern combination 343 and the downlink last antenna pattern combination 344. In some embodiments, the uplink first antenna pattern combination, the downlink first antenna pattern combination, the uplink last antenna pattern combination and the downlink last antenna pattern combination are the copies of the first antenna pattern combination 331 and the last antenna pattern combination 332 respectively, but the present disclose is not limited in this regard, and the processor 130 can generate the uplink first antenna pattern combination and the downlink first antenna pattern combination that are different from the first antenna pattern combination, and generate the uplink last antenna pattern combination and the downlink last antenna pattern that are different from the last antenna pattern combination according to the network status.

Next, operation S270 is executed to set an uplink transmission antenna pattern combination and a downlink transmission antenna pattern combination according to transmission data rates. In some embodiments, the detector 110 detects the transmission data rates when the communication device 100 communicates with the antenna devices 150 by the uplink first antenna pattern combination, the uplink last antenna pattern combination, the downlink first antenna pattern combination and the downlink last antenna pattern combination respectively. The processor 130 then selects one antenna pattern combination that has larger data rate among the uplink first antenna pattern combination and the uplink last antenna pattern combination as the uplink transmission antenna pattern combination, and selects one antenna pattern combination that has larger data rate among the downlink first antenna pattern combination and the downlink last antenna pattern combination as the downlink transmission antenna pattern combination.

With respect to operation S270, reference is made to FIG. 2 and FIG. 3C. As shown in FIG. 3C, when the data rate corresponding to the uplink first antenna pattern combination 341 is larger than the data rate corresponding to the uplink last antenna pattern combination 343, the processor 130 sets the weight W411=1 and the weight W421=0, then adds the weights via the adder SUM. Subsequently, compares the calculation result from the adder SUM with the threshold T21=0.5 via the comparator CP to determine the uplink first antenna pattern combination 341 as the uplink antenna pattern combination 351. When the data rate corresponding to the uplink first antenna pattern combination 341 is smaller than the data rate corresponding to the uplink last antenna pattern combination 343, the processor 130 sets the weight W411=0 and the weight W421=1, then adds the weights by the adder SUM. After that, compares the calculation result from the adder SUM with the threshold T21=0.5 by the comparator CP to determine the uplink first antenna pattern combination 343 as the uplink antenna pattern combination 351.

As shown in FIG. 3C, when the data rate corresponding to the downlink first antenna pattern combination 342 is larger than the data rate corresponding to the downlink last antenna pattern combination 344, the processor 130 sets the weight W412=1 and the weight W422=0, then adds the weights by the adder SUM and compares the calculation result with the threshold T22=0.5 by the comparator CP to determine the uplink first antenna pattern combination 342 as the uplink antenna pattern combination 352. When the data rate corresponding to the downlink first antenna pattern combination 342 is smaller than the data rate corresponding to the downlink last antenna pattern combination 344, the processor 130 sets the weight W412=0 and the weight W422=1, then adds the weights by the adder SUM and compares the calculation result with the threshold T22=0.5 by the comparator CP to determine the uplink first antenna pattern combination 344 as the uplink antenna pattern combination 352.

Subsequently, operation S280 is executed to communicate with the antenna devices 150 via the uplink transmission antenna pattern combination and the downlink transmission antenna pattern combination. In some embodiments, the processor 130 selects the uplink transmission antenna pattern combination and the downlink transmission antenna pattern combination and then transmits the same to the antenna unit 140. The antenna elements of the antenna unit 140 are arranged as the uplink transmission antenna pattern when the communication device 100 performs an uplink transmission with the antenna devices 150 via the antenna unit 140. The antenna elements of the antenna unit 140 are arranged as the downlink transmission antenna pattern when the communication device 100 performs a downlink transmission with the antenna devices 150 via the antenna unit 140.

The present disclosure provides a communication method adapted in a multi-user MIMO system. The communication method selects an antenna pattern combination from the antenna pattern combinations of the router to perform an uplink transmission and selects an antenna pattern combination from the antenna pattern combinations of the router to perform a downlink transmission according to the changes of the received signal strength indicators and the data rates. By comparison to the traditional method for selecting the antenna pattern combination according to the received signal strength indicators, the present disclosure further adjusts the transmission antenna pattern combination based on the transmission data rates in a communication path between the router and users. The communication method in the present disclosure takes both the received signal strength indicators and the data rates into account. Furthermore, the transmission efficiency between the router and the users can be improved by using the concept of grouping.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A communication method for a communication device communicating with an antenna device group, comprising:
grouping a plurality of antenna patterns of the communication device to form a plurality of antenna pattern sets according to the antenna device group and selecting at least one antenna pattern set from the antenna pattern sets;
selecting a first antenna pattern combination and a last antenna pattern combination from a plurality of antenna pattern combinations according to a plurality of signal parameter statistics of the antenna pattern combinations, wherein the antenna pattern combinations correspond to each of the selected at least one antenna pattern set; and
setting the first antenna pattern combination or the last antenna pattern combination to be a transmission antenna pattern combination according to a first data associated with the first antenna pattern combination and a second data associated with the last antenna pattern combination.

2. The communication method of claim 1, wherein the step of selecting at least one antenna pattern set comprises:
selecting the antenna pattern sets when a network status is unknown;
comparing a plurality of weights corresponding to the antenna pattern sets with a threshold, when the network status is known; and
selecting the at least one antenna pattern set according to the comparison result.

3. The communication method of claim 1, further comprising:
switching an uplink data transmission of the communication device from an uplink first antenna pattern combination to an uplink last antenna pattern combination, or switching a downlink data transmission of the communication device from a downlink first antenna pattern combination to a downlink last antenna pattern combination according to the first data and the second data.

4. The communication method of claim 3, wherein the uplink data transmission is switched from the uplink first antenna pattern combination to the uplink last antenna pattern combination when an uplink transmission data rate is lower than a last uplink transmission data rate, and the downlink data transmission is switched from the downlink first antenna pattern combination to the downlink last antenna pattern combination when a downlink transmission data rate is lower than a last downlink transmission data rate.

5. The communication method of claim 1, wherein selecting the first antenna pattern combination and the last antenna pattern combination from the antenna pattern combinations according to the signal parameter statistics of the antenna pattern combinations further comprises:
selecting the first antenna pattern combination and the last antenna pattern combination according to a plurality of received signal strength indicator statistics of each antenna pattern combination,
wherein the first antenna pattern combination has a maximal one of the received signal strength indicator statistics, and the last antenna pattern combination has a minimal one of the received signal strength indicator statistics.

6. The communication method of claim 1, wherein setting the first antenna pattern combination or the last antenna pattern combination to be the transmission antenna pattern combination according to the first data and the second data further comprises:
selecting the first antenna pattern combination to be the transmission antenna pattern combination when a data rate of the first data is higher than a data rate of the second data; and
selecting the last antenna pattern combination to be the transmission antenna pattern combination when the data rate of the first data is lower than the data rate of the second data.

7. A communication device, comprising:
a detector communicated with an antenna device group and detecting a plurality of signal parameters and a plurality of data corresponding to the antenna device group;
an antenna unit; and
a processor coupled to the detector and the antenna unit, wherein the processor groups a plurality of antenna patterns of the antenna unit to form a plurality of antenna pattern sets according to the antenna device group, and selects at least one antenna pattern set from the antenna pattern sets, the processor further selects a first antenna pattern combination and a last antenna pattern combination from a plurality of antenna pattern combinations corresponding to each of the selected at least one antenna pattern set according to the signal parameters, the processor further sets the first antenna pattern combination or the last antenna pattern combination to be a transmission antenna pattern combination according to the plurality of data, and transmits the transmission antenna pattern combination to the antenna unit,
wherein the antenna unit is further configured to communicate with the antenna device group based on the transmission antenna pattern combination.

8. The communication device of claim 7, wherein the processor selects at least one antenna pattern set according to a comparison result of a plurality of weights corresponding to the antenna pattern sets and a threshold when a network status is known.

9. The communication device of claim 7, wherein the processor is further configured to switch an uplink data transmission from an uplink first antenna pattern combination to an uplink last antenna pattern combination, or switch a downlink data transmission from a downlink first antenna pattern combination to a downlink last antenna pattern combination according to a relationship of a first data corresponding to the first antenna pattern combination and a second data corresponding to the last antenna pattern combination.

10. The communication device of claim 7, wherein the processor is further configured to control the antenna unit to switch from an uplink first antenna pattern combination to an uplink last antenna pattern combination when an uplink transmission data rate is lower than a last uplink transmission data rate, and to control the antenna unit to switch from a downlink first antenna pattern combination to a downlink last antenna pattern combination when a downlink transmission data rate is lower than a last downlink transmission data rate.

* * * * *